(12) United States Patent
Col et al.

(10) Patent No.: US 8,090,931 B2
(45) Date of Patent: Jan. 3, 2012

(54) MICROPROCESSOR WITH FUSED STORE ADDRESS/STORE DATA MICROINSTRUCTION

(75) Inventors: Gerard M. Col, Austin, TX (US); G. Glenn Henry, Austin, TX (US); Rodney E. Hooker, Austin, TX (US); Terry Parks, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 440 days.

(21) Appl. No.: 12/233,261

(22) Filed: Sep. 18, 2008

(65) Prior Publication Data
US 2010/0070741 A1    Mar. 18, 2010

(51) Int. Cl.
*G06F 9/34* (2006.01)
(52) U.S. Cl. ........................................ 712/218
(58) Field of Classification Search .................. None
See application file for complete search history.

(56) References Cited

U.S. PATENT DOCUMENTS

| | | | |
|---|---|---|---|
| 3,757,308 A * | 9/1973 | Fosdick ........................ | 708/706 |
| 5,845,321 A * | 12/1998 | Ito et al. ........................ | 711/118 |
| 5,951,676 A * | 9/1999 | Henry et al. ................... | 712/225 |
| 6,085,312 A * | 7/2000 | Abdallah et al. .............. | 712/208 |
| 6,279,102 B1 * | 8/2001 | Morrison ...................... | 712/216 |
| 6,889,318 B1 * | 5/2005 | Wichman ...................... | 712/226 |
| 7,051,190 B2 | 5/2006 | Samra et al. | |
| 7,058,794 B2 * | 6/2006 | Col et al. ...................... | 712/225 |
| 7,076,639 B2 * | 7/2006 | Col et al. ...................... | 712/225 |
| 7,080,236 B2 * | 7/2006 | Jourdan et al. ................ | 712/202 |
| 7,818,550 B2 * | 10/2010 | Vaden ........................... | 712/226 |
| 2002/0087955 A1 * | 7/2002 | Ronen et al. .................. | 717/151 |
| 2003/0236966 A1 * | 12/2003 | Samra et al. .................. | 712/209 |
| 2003/0236967 A1 * | 12/2003 | Samra et al. .................. | 712/210 |
| 2004/0003308 A1 * | 1/2004 | Luick ............................ | 713/320 |
| 2004/0034757 A1 * | 2/2004 | Gochman et al. ............. | 711/219 |
| 2004/0128480 A1 * | 7/2004 | Anati et al. ................... | 712/214 |
| 2004/0199755 A1 * | 10/2004 | Sperber et al. ................ | 712/244 |
| 2005/0228974 A1 * | 10/2005 | Col et al. ...................... | 712/224 |
| 2007/0038844 A1 * | 2/2007 | Valentine et al. ............. | 712/219 |
| 2007/0300049 A1 * | 12/2007 | Sodani et al. ................. | 712/226 |
| 2009/0198978 A1 * | 8/2009 | Greenhalgh et al. .......... | 712/226 |
| 2010/0064122 A1 * | 3/2010 | Henry et al. .................. | 712/226 |
| 2010/0115248 A1 * | 5/2010 | Ouziel et al. .................. | 712/226 |

OTHER PUBLICATIONS

Tendler et al. (POWER4 system microarchitecture); IBM J. Res. & Dev. vol. 46 No. 1; Jan. 2002, 21 pages.*

(Continued)

*Primary Examiner* — Keith Vicary
(74) *Attorney, Agent, or Firm* — E. Alan Davis; James W. Huffman

(57) ABSTRACT

A microprocessor includes an instruction translator that translates PUSHF, POP, and MOVSB x86 macroinstructions into multiple microinstructions that include a fused store microinstruction. For PUSHF, first and second microinstructions moves the x86 EFLAGS register into and mask off bits in a temporary register, and the fused store microinstruction stores it to a memory location. For POP, a first microinstruction loads a first memory location value into a temporary register and the fused store microinstruction stores it to the second memory location. For MOVSB, the first microinstruction loads a first memory location operand into a temporary register and the fused store microinstruction stores it to a second memory location. A reorder buffer receives the fused store microinstruction into exactly one entry. In response to the fused store microinstruction, an instruction dispatcher dispatches store address and store data microinstructions, neither of which occupies a reorder buffer entry, to different respective execution units.

12 Claims, 8 Drawing Sheets

| macroinstruction | microinstruction sequence |
|---|---|
| PUSH reg | fused store push SP, 0, reg |
| PUSHF | MvFrmEfl temp<br>AND temp, immediate_value<br>fused store push SP, 0, temp |
| POP [AX+BX] | LOAD SP, 0, temp<br>XLEA SP<br>fused store AX, BX, temp |
| MOVSB | LOAD SI, 0, temp<br>fused store update DI, 0, temp<br>XLEA SI |
| STOSB | fused store update DI, 0, AL |
| Near CALL | Xbcc<br>fused store update SP, 0, IP |

OTHER PUBLICATIONS

Gochman et al. (the Intel Pentium M Processor: Microarchitecture and Performance); Intel Technology Journal—vol. 7, Issue 2, May 21, 2003, 18 pages.*

Intel (Intel 64 and IA-32 Architectures Software Developer's Manual)—vol. 1: Basic Architecture—Order No. 253665-022US; Nov. 2006; title page and p. 2-11.*

Intel (Intel 64 and IA-32 Architectures Software Developer's Manual)—vol. 2A: Instruction Set Reference, A-M—Order No. 253666-022US; Nov. 2006; title page and pp. 3-654 and 3-655.*

Intel (Intel 64 and IA-32 Architectures Software Developer's Manual)—vol. 2B: Instruction Set Reference, N-Z—Order No. 253667-022US; Nov. 2006; title page and p. 4-127.*

OSdata (Addressing Modes in Assembly Language); Last Updated/Published Mar. 17, 2001; accessed Dec. 8, 2009 at http://www.osdata.com/topic/language/asm/address.htm; 11 pages.*

* cited by examiner

*Fig. 3a*

304 fused store microinstruction

| opcode (fused store) 308 | source A 312 | source B 316 | source C 320 | destination 324 | displacement 328 |

*Fig. 3b*

332 store address (STA) microinstruction

| opcode (STA) 336 | source A 340 | source B 344 | source C 348 | destination 352 | displacement 356 |

*Fig. 3c*

338 store data (STD) microinstruction

| opcode (STD) 358 | source A 360 | source B 364 | source C 368 | destination 372 | displacement 376 |

*Fig. 3d*

394 store macroinstruction

| opcode 382 | base 384 | index 386 | source 388 | displacement 392 |

*Fig. 4*

404 ROB entry

| microinstruction 406 | fused store flag 408 | STD completed flag 412 | STA completed flag 416 | tag 420 |

Fig. 8a (Related Art)

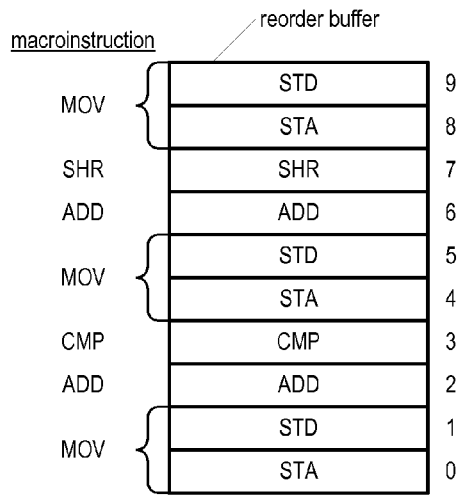

Fig. 8b

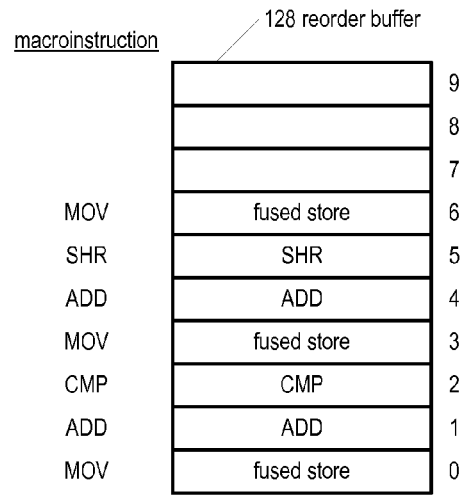

Fig. 9a (Related Art)

| instruction translator input | instruction translator output | | |
|---|---|---|---|
| macroinstruction | microinstruction generated | clock cycle | ROB entry |
| MOV [mem], CX | STA | 1 | 1 |
| | STD | 1 | 2 |
| MOV [mem], AX | STA | 2 | 3 |
| | STD | 2 | 4 |
| ADD SI, DX | ADD | 2 | 5 |

Fig. 9b

| instruction translator input | instruction translator output | | |
|---|---|---|---|
| macroinstruction | microinstruction generated | clock cycle | ROB entry |
| MOV [mem], CX | fused store | 1 | 1 |
| MOV [mem], AX | fused store | 1 | 2 |
| ADD SI, DX | ADD | 1 | 3 |

Fig. 10

| macroinstruction | microinstruction sequence |
|---|---|
| PUSH reg | fused store push SP, 0, reg |
| PUSHF | MvFrmEfl temp<br>AND temp, immediate_value<br>fused store push SP, 0, temp |
| POP [AX+BX] | LOAD SP, 0, temp<br>XLEA SP<br>fused store AX, BX, temp |
| MOVSB | LOAD SI, 0, temp<br>fused store update DI, 0, temp<br>XLEA SI |
| STOSB | fused store update DI, 0, AL |
| Near CALL | Xbcc<br>fused store update SP, 0, IP |

MICROPROCESSOR WITH FUSED STORE ADDRESS/STORE DATA MICROINSTRUCTION

FIELD OF THE INVENTION

The present invention relates in general to the field of microprocessors, and particularly to superscalar out-of-order execution microprocessors.

BACKGROUND OF THE INVENTION

It is common for microprocessors with complicated macroarchitectures, commonly referred to as complicated instruction set computer (CISC) macroarchitectures—a popular example being the x86 macroarchitecture, to employ drastically different microarchitectures internally, commonly referred to as reduced instruction set computer (RISC) microarchitectures. Such microprocessors translate each macroinstruction of their macroinstruction set specified by the program into one or more simpler microinstructions that perform the necessary constituent operations within the microprocessor to achieve the semantic of the macroinstruction.

A macroinstruction type that is very frequently executed by programs is a store macroinstruction. A store macroinstruction instructs the microprocessor to store data from a register within the microprocessor to a memory location specified by the store macroinstruction. An example of a store macroinstruction is an x86 MOV macroinstruction, such as a MOV [AX+BX], CX instruction, which instructs the microprocessor to move the contents of the CX register to the memory location whose address includes the sum of the AX and BX registers. Because store macroinstructions are very frequently executed by programs, there is a need to enable a microprocessor to execute store macroinstructions faster.

SUMMARY OF THE INVENTION

In one aspect the present invention provides a microprocessor, having a macroarchitecture with a macroinstruction set and a microarchitecture with a microinstruction set. The microprocessor includes an x86 EFLAGS register. The microprocessor also includes an instruction translator configured to translate an x86 push flags (PUSHF) macroinstruction into first, second, and third microinstructions. The PUSHF macroinstruction is an instruction in the macroinstruction set that instructs the microprocessor to push the value of the x86 EFLAGS register of the microprocessor to a memory location specified by a stack pointer register of the microprocessor. The first microinstruction moves the x86 EFLAGS register value into a temporary register of the microprocessor. The second microinstruction masks off bits in the temporary register. The third microinstruction is a fused store microinstruction that stores the masked-off value in the temporary register to the memory location. The first, second, and third microinstructions are instructions in the microinstruction set. The microprocessor also includes a hardware reorder buffer (ROB), having a plurality of entries, configured to receive from the instruction translator the fused store microinstruction into exactly one of the plurality of entries. The microprocessor also includes an instruction dispatcher configured to dispatch for execution a store address microinstruction and a store data microinstruction to different respective execution units of the microprocessor, in response to receiving the fused store microinstruction. Neither the store address microinstruction nor the store data microinstruction occupy any of the plurality of ROB entries. The ROB is further configured to retire the fused store microinstruction after being notified that both the store address microinstruction and the store data microinstruction have been executed.

In another aspect, the present invention provides a microprocessor, having a macroarchitecture with a macroinstruction set and a microarchitecture with a microinstruction set. The microprocessor includes an instruction translator configured to translate an x86 pop a value from the stack to memory (POP) macroinstruction into at least first and second microinstructions. The POP macroinstruction is an instruction in the macroinstruction set that instructs the microprocessor to pop a value of a first memory location specified by a stack pointer register of the microprocessor to a second memory location. The first microinstruction loads into a temporary register of the microprocessor the value from the first memory location. The second microinstruction is a fused store microinstruction that stores the value in the temporary register to the second memory location. The first and second microinstructions are instructions in the microinstruction set. The microprocessor also includes a hardware reorder buffer (ROB), having a plurality of entries, configured to receive from the instruction translator the fused store microinstruction into exactly one of the plurality of entries. The microprocessor also includes an instruction dispatcher configured to dispatch for execution a store address microinstruction and a store data microinstruction to different respective execution units of the microprocessor, in response to receiving the fused store microinstruction. Neither the store address microinstruction nor the store data microinstruction occupy any of the plurality of ROB entries. The ROB is further configured to retire the fused store microinstruction after being notified that both the store address microinstruction and the store data microinstruction have been executed.

In yet another aspect, the present invention provides a microprocessor, having a macroarchitecture with a macroinstruction set and a microarchitecture with a microinstruction set. The microprocessor includes an instruction translator configured to translate an x86 move data from string to string (MOVSB) macroinstruction into at least first and second microinstructions. The MOVSB macroinstruction is an instruction in the macroinstruction set that instructs the microprocessor to move an operand from a first memory location to a second memory location. The first microinstruction loads into a temporary register of the microprocessor the operand from the first memory location. The second microinstruction is a fused store microinstruction that stores the operand in the temporary register to the second memory location. The first and second microinstructions are instructions in the microinstruction set. The microprocessor also includes a hardware reorder buffer (ROB), having a plurality of entries, configured to receive from the instruction translator the fused store microinstruction into exactly one of the plurality of entries. The microprocessor also includes an instruction dispatcher, configured to dispatch for execution a store address microinstruction and a store data microinstruction to different respective execution units of the microprocessor, in response to receiving the fused store microinstruction. Neither the store address microinstruction nor the store data microinstruction occupy any of the plurality of ROB entries. The ROB is further configured to retire the fused store microinstruction after being notified that both the store address microinstruction and the store data microinstruction have been executed.

BRIEF DESCRIPTION OF THE DRAWINGS

FIG. 3a is a block diagram illustrating the fused store microinstruction of the present invention.

FIG. 3b is a block diagram illustrating the store address microinstruction of the present invention.

FIG. 3c is a block diagram illustrating the store data microinstruction of the present invention.

FIG. 3d is a block diagram illustrating a store macroinstruction.

FIG. 4 is a block diagram illustrating a ROB entry of the ROB of FIG. 1 of the present invention.

FIG. 8a is a diagram illustrating a group of microinstructions in a reorder buffer of a conventional microprocessor.

FIG. 8b is a diagram illustrating a group of microinstructions in ROB of FIG. 1 according to the present invention.

FIG. 9a is a diagram illustrating an example of operation of a conventional microinstruction translator.

FIG. 9b is a diagram illustrating an example of operation of the microinstruction translator of FIG. 1 according to the present invention.

FIG. 10 is examples of x86 macroinstructions that the microprocessor translates into microinstruction sequences that include the fused store microinstruction, the fused store push microinstruction, or the fused store update microinstruction according to the present invention.

DETAILED DESCRIPTION OF THE INVENTION

Figure 1:
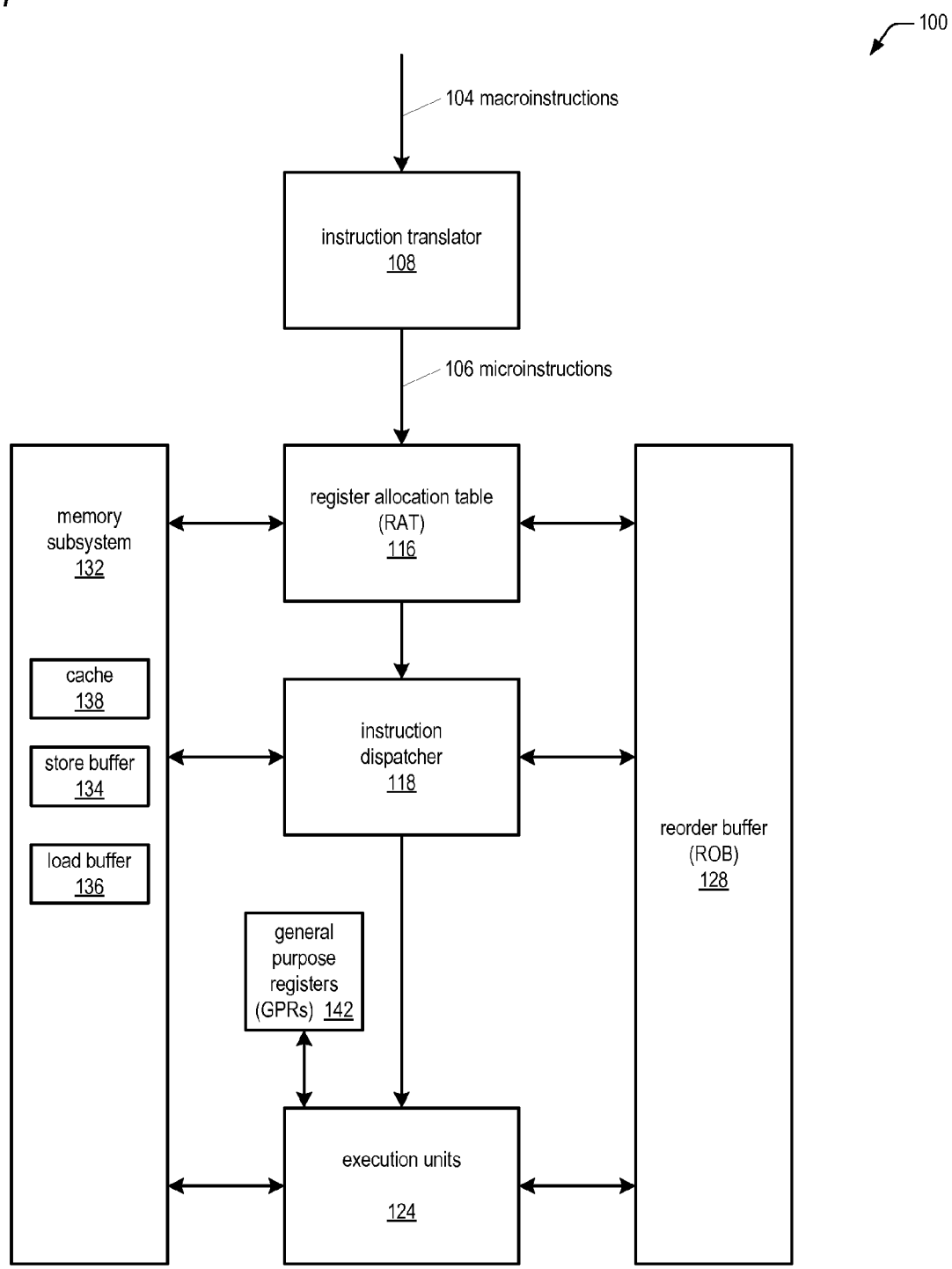
FIG. 1 is a block diagram illustrating a microprocessor according the present invention.

Referring now to FIG. 1, a block diagram illustrating a microprocessor 100 according the present invention is shown. The microprocessor 100 includes an instruction translator 108; a register allocation table (RAT) 116 coupled to the instruction translator 108; an instruction dispatcher 118 coupled to the RAT 116; execution units 124 coupled to the instruction dispatcher 118; general purpose registers (GPRs) 142 coupled to the execution units 124; a reorder buffer (ROB) 128 coupled to the RAT 116, the instruction dispatcher 118, and the execution units 124; and a memory subsystem 132 coupled to the RAT 116, instruction dispatcher 118, and execution units 124. The memory subsystem 132 includes a cache memory 138 that caches data of the system memory. The cache memory 138 may include separate instruction and data caches or a single unified cache memory or both. The cache 138 may include a hierarchy of memories, such as one or more level-1 caches and a level-2 cache. The memory subsystem 132 also includes store buffers 134 used to buffer data being written to memory including the cache memory 138, and load buffers 136 used to buffer data read from memory including the cache memory 138.

Microprocessor 100 is a superscalar processor because it is capable of issuing multiple microinstructions to the execution units 124 per clock cycle. Additionally, the microprocessor 100 is an out-of-order execution processor because the execution units 124, both collectively and individually, are allowed to execute their respective microinstructions in an order different than the program order of their corresponding macroinstructions. The microprocessor 100 has a separate macroarchitecture and microarchitecture. In one embodiment, the macroarchitecture of the microprocessor 100 is an x86 macroarchitecture. A microprocessor has an x86 macroarchitecture if it can correctly execute a majority of the application programs that are designed to be executed on an x86 microprocessor. An application program is correctly executed if its expected results are obtained. In particular, the microprocessor 100 executes instructions of the IA-32 instruction set and includes the IA-32 user-visible register set. In one embodiment, the GPRs 142 are a register set configured such that a microinstruction can read exactly two source operands from the GPRs 142 in a given clock cycle. In one embodiment, the GPRs 142 include the set of general purpose registers of the x86 architecture, such as the EAX, EBX, ECX, EDX, ESI, EDI, ESP, EBP, as well as the media instruction-related registers, such as the MMX and XMM register sets. In one embodiment, microinstructions of the microinstruction set are enabled to read a source operand from each of two registers of the GPRs 142 specified by first and second respective source operand fields of the microinstructions, such as the source A 340 and source B 344 fields of FIG. 3b, or the source A 360 and source B 364 fields of FIG. 3c; however, the microinstructions of the microinstruction set are not enabled to read a source operand from registers of the GPRs 142 specified by a third source operand field of the microinstructions, such as the source C 348 field of FIG. 3b or the source C 368 field of FIG. 3c, although other registers, such as the x86 EFLAGS register, may be specified by the third source operand field and read in the same clock cycle as the two GPRs 142 specified by the first and second source operand fields are read. However, as discussed below, in one embodiment in which one or more of the first and second source operand fields are unused by a particular microinstruction, the microprocessor 100 includes special logic that enables the microinstruction to read a source operand from registers of the GPRs 142 specified by the third source operand field of the microinstructions, such as the source C 368 field of FIG. 3c. The embodiments in which microinstructions of the microinstruction set are enabled to read a source operand from only two registers of the GPRs 142 advantageously enables the size of the GPRs 142 to be smaller, their speed to be faster, their power consumption to be lower, and the wiring to them to be less complex, since it potentially reduces the number of read ports of the GPRs 142.

Figure 6:
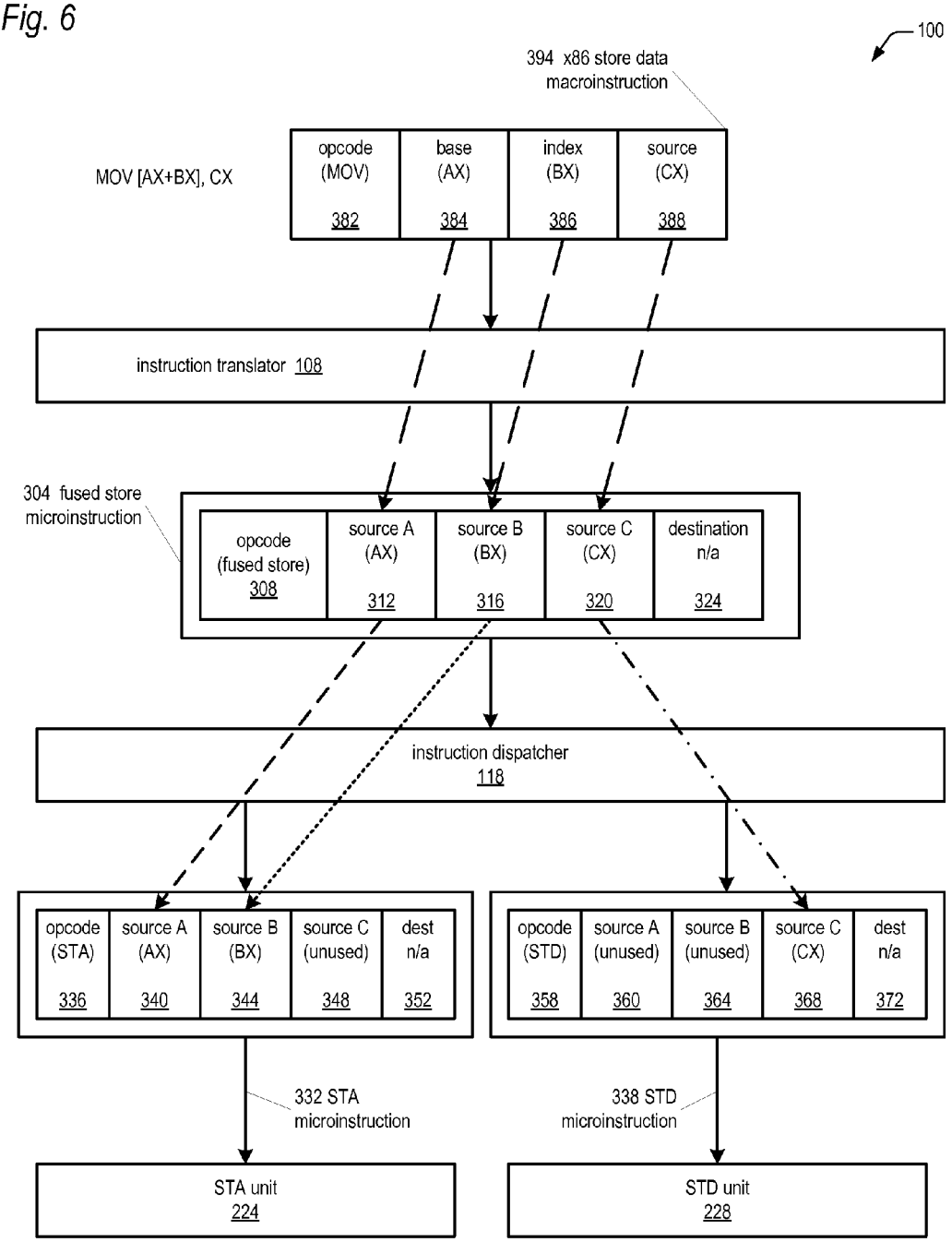
FIG. 6 is a block diagram illustrating operand movement by the microprocessor of FIG. 1 to execute a store macroinstruction of FIG. 3, according to the present invention.

The instruction translator 108 receives macroinstructions 104, such as the store macroinstruction 394 (of FIG. 3d), from an instruction cache within cache 138 and responsively translates each macroinstruction 104 into one or more microinstructions 106 that collectively perform the operation specified by the macroinstruction 104. A store macroinstruction is defined herein as a macroinstruction that simply instructs the microprocessor 100 to store data from a macroarchitecture register of the microprocessor 100 to a location in memory whose address is specified by the store macroinstruction. An example of a store macroinstruction is an x86 MOV macroinstruction, such as a MOV [AX+BX], CX instruction (such as shown in the example of FIG. 6), which instructs the microprocessor 100 to move the contents of the CX register to the memory location whose address includes the sum of the AX and BX registers. The format, generation, operation, and retirement of the fused store microinstruction 304 is described in more detail below.

In one embodiment, the width of the instruction translator 108 is three. That is, the instruction translator 108 is capable of generating up to three microinstructions 106 per clock cycle. Depending upon the mix of macroinstructions 104, the instruction translator 108 can generate the three microinstructions 106 in one clock cycle from one, two, or three macroinstructions 104. That is, if each of the next three macroinstructions 104 to be translated require only a single microinstruction 106, then all three macroinstructions 104 can be translated in a single clock cycle; alternatively, if one of the next two macroinstructions 104 requires two microinstructions 106 and the other of the next two macroinstructions 104 requires one microinstruction 106, then only the next two macroinstructions 104 can be translated in a single clock cycle; alternatively, if the next macroinstruction 104 to be translated requires three microinstructions 106, then only the next macroinstruction 104 can be translated in a single clock cycle.

Advantageously, the instruction translator 108 of the present invention translates a store macroinstruction 394 into exactly one microinstruction 106 of the microarchitecture instruction set, namely a fused store microinstruction 304 (described with respect to FIG. 3a).

Figure 2:
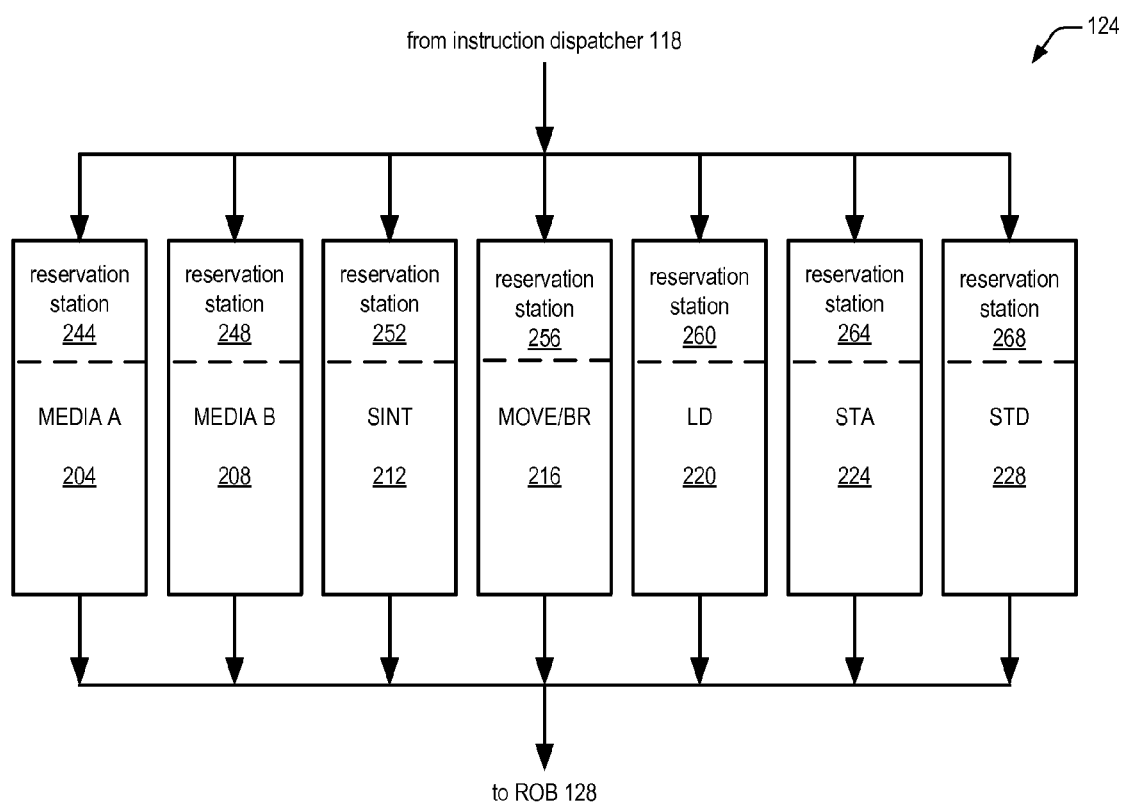
FIG. 2 is a block diagram illustrating seven separate execution units within the execution units of the microprocessor of FIG. 1.

Referring now to FIG. 2, a block diagram illustrating seven separate execution units 204-228 within execution units 124 of the microprocessor 100 of FIG. 1 is shown. Each of execution units 204-228 is designed to execute in parallel and independently from any other execution unit 124 in the preferred embodiment. The execution units 204-228 have queues called reservation stations 244-268 on the input side (from the instruction dispatcher 118) and microinstructions 106 are loaded into the queues by the instruction dispatcher 118 or the ROB 128 for execution. In a preferred embodiment, reservation stations 244 in media A unit 204, 252 in SINT unit 212, 256 in Move/BR unit 216, 260 in LD unit 220, and 268 in STD unit 228 each can store up to 12 microinstructions 106, and reservation stations 248 in media B unit 208 and 264 in STA unit 224 each can store up to 8 microinstructions 106. An execution unit 124 takes a microinstruction 106 from its reservation station and executes it after the instruction dispatcher 118 has determined that all the source operands of the microinstruction 106 are available, i.e., the microinstruction 106 is "ready" for execution. Each of these separate execution units 204-228 receives microinstructions 106 from instruction dispatcher 118 and sets a completion status flag in reorder buffer 128 when execution of the microinstruction 106 is completed.

The first execution unit is called MEDA (media A) 204, and executes floating point operations. The second execution unit is called MEDB (media B) 208, and executes multiply operations. The third execution unit is called SINT (simple integer) 212, and executes integer ALU operations. The fourth execution unit is called MOV/BR (move/branch) 216, and executes move or branch operations as well as simple ALU operations as the SINT execution unit 212 performs. The fifth execution unit is called LD (load data) 220, and fetches operands for computation from memory into registers of the microprocessor 100. The sixth execution unit is called STA (store address) 224, and calculates the destination address for a store operation and writes the address to a store buffer 134 allocated for the store operation. The seventh execution unit is called STD (store data) 228, and stores the results of computations from other execution units 124 to an allocated store buffer for subsequent storage to memory.

Referring now to FIG. 3a, a block diagram illustrating the fused store microinstruction 304 of the present invention is shown. The microinstructions 106 of FIG. 1 include fused store microinstructions 304. The fused store microinstruction 304 includes an opcode field 308; three source address fields, denoted source A 312, source B 316, and source C 320; a destination field 324; and a displacement field 328. The opcode field 308 includes a unique value indicating the microinstruction is a fused store microinstruction 304. The source A field 312 and source B field 316 include values that specify general purpose registers of the microprocessor 100 that hold operands used to calculate the store memory address. The displacement field 328 holds a constant value also used to calculate the store memory address. The source C field 320 includes a value that specifies a general purpose register that holds the data to be stored to the memory location specified by the calculated store memory address. The destination field 324 is unused. However, in embodiments described below with respect to the fused store push microinstruction and fused store update microinstruction variants of the fused store microinstruction 304, the variant microinstructions also perform an update of the register specified in the destination field 324. In one embodiment, the fused store microinstruction 304 stores an immediate value to memory, rather than a value from a register.

Referring now to FIG. 3b, a block diagram illustrating the store address microinstruction 332 of the present invention is shown. The store address microinstruction 332 has an opcode field 336; three source address fields, denoted source A 340, source B 344, and source C 348; a destination field 352; and a displacement field 356. The opcode field 336 includes a unique value indicating the microinstruction is a store address microinstruction 332. The source A field 340 and source B field 344 include values that specify general purpose registers of the microprocessor 100 that hold operands used to calculate the store memory address. The displacement field 356 holds a constant value also used to calculate the store memory address. In one embodiment, the source C field 348 and the destination field 352 are unused.

Referring now to FIG. 3c, a block diagram illustrating the store data microinstruction 338 of the present invention is shown. The store data microinstruction 338 has an opcode field 358; three source address fields, denoted source A 360, source B 364, and source C 368; a destination field 372; and a displacement field 376. The opcode field 358 includes a unique value indicating the microinstruction is a store data microinstruction 338. The source C field 368 includes a value that specifies a general purpose register that holds the data to be stored to the memory location specified by the store memory address calculated by the associated store address microinstruction 332. The source A field 360, the source B field 364, the destination field 372, and the displacement field 376 are unused.

As discussed below, when the instruction dispatcher 118 receives a fused store microinstruction 304 from the RAT 116, rather than dispatching the fused store microinstruction 304 to an execution unit 124, the instruction dispatcher 118 dispatches a store address microinstruction 332 to the STA Unit 224 and dispatches a store data microinstruction 338 to the STD Unit 228, although neither the store address microinstruction 332 nor the store data microinstruction 338 occupy an entry in the ROB 128.

Referring now to FIG. 3d, a block diagram illustrating a store macroinstruction 394 is shown. The store macroinstruction 394 has an opcode field 382; a base field 384; an index field 386; a source field 388; and a displacement field 392. The opcode field 382 includes a unique value indicating the macroinstruction is a store macroinstruction 394, such as an x86 MOV instruction. The base field 384 includes a value that specifies a general purpose register that holds a base address value. The index field 386 includes a value that specifies a general purpose register that holds an array index value that may be scaled by a size of the array elements. The displacement field 392 includes a constant value that is added to the base address and scaled array index values to calculate the store memory address. An example of a store macroinstruction 394 is an x86 MOV macroinstruction, such as a MOV [AX+BX], CX instruction (such as shown in the example of FIG. 6), which instructs the microprocessor 100 to move the contents of the CX register to the memory location whose address includes the sum of the AX and BX registers.

Referring now to FIG. 4, a block diagram illustrating a ROB entry 404 of the ROB 128 of FIG. 1 of the present invention is shown. Each entry 404 includes a microinstruction field 406, a fused store flag 408, a STD completed flag 412, a STA completed flag 416, and a tag field 420. The microinstruction field 406 stores the microinstruction for which the ROB entry 404 is allocated. When the RAT 116 receives a new microinstruction, the RAT 116 allocates an entry 404 in the ROB 128 and writes the microinstruction into the microinstruction field 406. The fused store flag 408, if set, indicates the microinstruction stored in the microinstruction field 406 is a fused store microinstruction 304. The STD completed flag 412, when set, indicates that the STD Unit 228 has completed execution of the store data microinstruction 338 associated with the fused store microinstruction 304. The STA completed flag 416, when set, indicates that the STA Unit 224 has completed execution of the store address microinstruction 332 associated with the fused store microinstruction 304. The ROB 128 is an array of entries 404 logically addressed as a circular FIFO. The tag field 420 value indicates the index associated with each entry 404.

Figure 5:
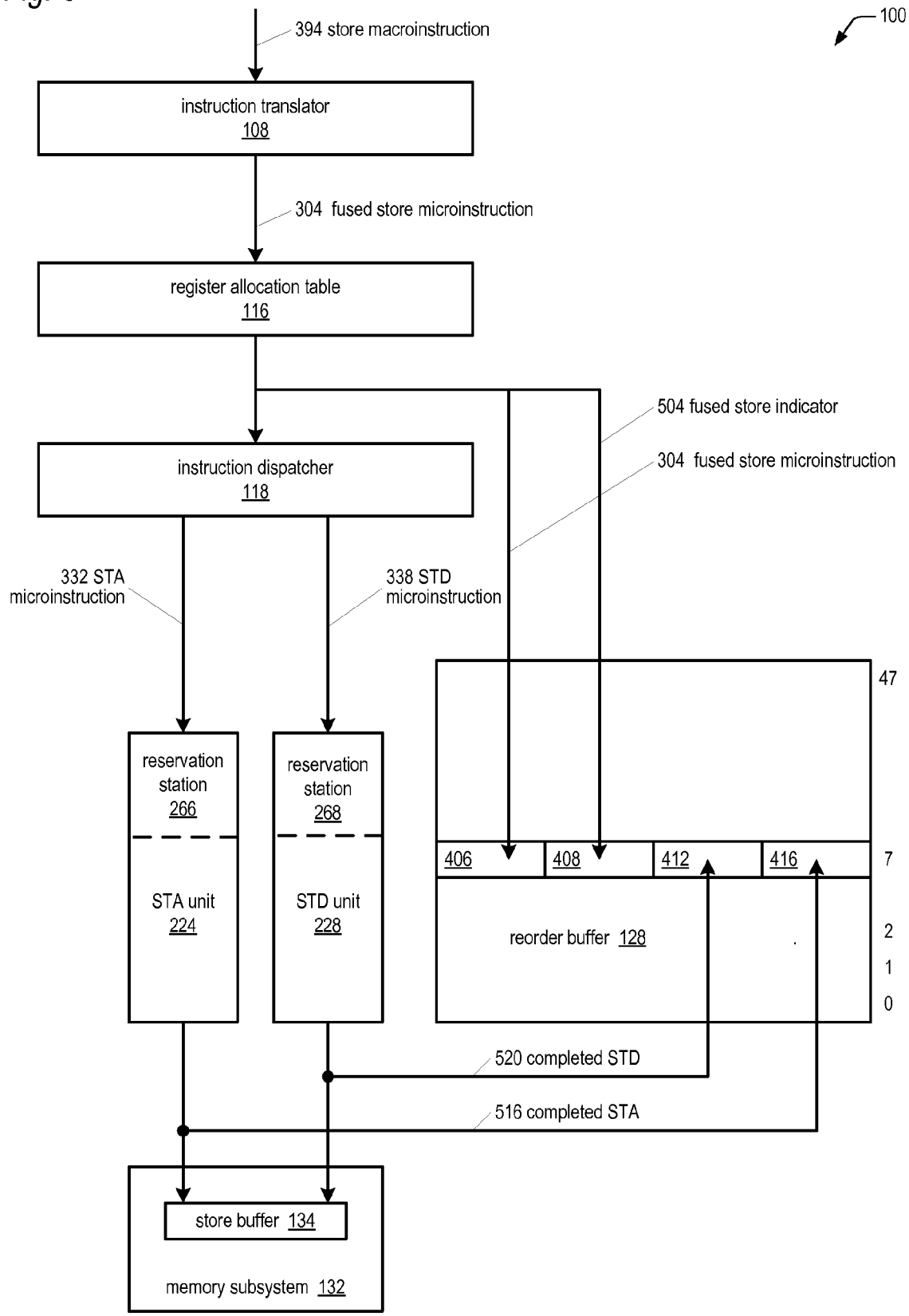
FIG. 5 is a block diagram illustrating portions of the microprocessor of FIG. 1 in operation to execute a store macroinstruction of FIG. 3 according to the present invention.

Referring now to FIG. 5, a block diagram illustrating portions of the microprocessor 100 of FIG. 1 in operation to execute a store macroinstruction 394 of FIG. 3 according to the present invention is shown. FIG. 5 includes the instruction translator 108, RAT 116, instruction dispatcher 118, memory subsystem 132 and store buffer 134, and ROB 128 of FIG. 1. FIG. 5 also includes the STA Unit 224 and STD Unit 228 of FIG. 2 and their associated reservation stations 266 and 268 of FIG. 2. FIG. 5 also illustrates the instruction dispatcher 118 dispatching a store address microinstruction 332 to the STA Unit 224 and a store data microinstruction 338 to the STD Unit 228. The ROB 128 is shown in FIG. 5 with entries 0 through 47. In particular, entry 7 is shown with its fields from FIG. 4. FIG. 5 also illustrates that the RAT 116 outputs a fused store indicator 504 to the ROB 128. FIG. 5 also illustrates that the STA Unit 224 outputs a completed STA signal 516 to the ROB 128 and the STD Unit 228 generating a completed STD signal 520 to the ROB 128. FIG. 5 will be discussed further in connection with the description of the flowchart of FIG. 7.

Referring now to FIG. 6, a block diagram illustrating operand movement by the microprocessor 100 of FIG. 1 to execute a store macroinstruction 394 of FIG. 3, according to the present invention is shown. FIG. 6 also includes the instruction translator 108 and instruction dispatcher 118 of FIG. 1 and the STA Unit 224 and STD Unit 228 of FIG. 2. The example of FIG. 6 illustrates the microprocessor 100 processing an x86 MOV instruction: MOV [AX+BX], CX. FIG. 6 illustrates the flow of source operands from the store macroinstruction 394 of FIG. 3d to the fused store microinstruction 304 of FIG. 3a to the store address microinstruction 332 of FIG. 3b and store data microinstruction 338 of FIG. 3c. In the example of FIG. 6, for simplicity of illustration, the displacement field 392 of the store macroinstruction 394 is zero; therefore, it is not shown and the displacement fields 328/356/376 are also not shown. FIG. 6 will be discussed further in connection with the description of the flowchart of FIG. 7.

Figure 7:
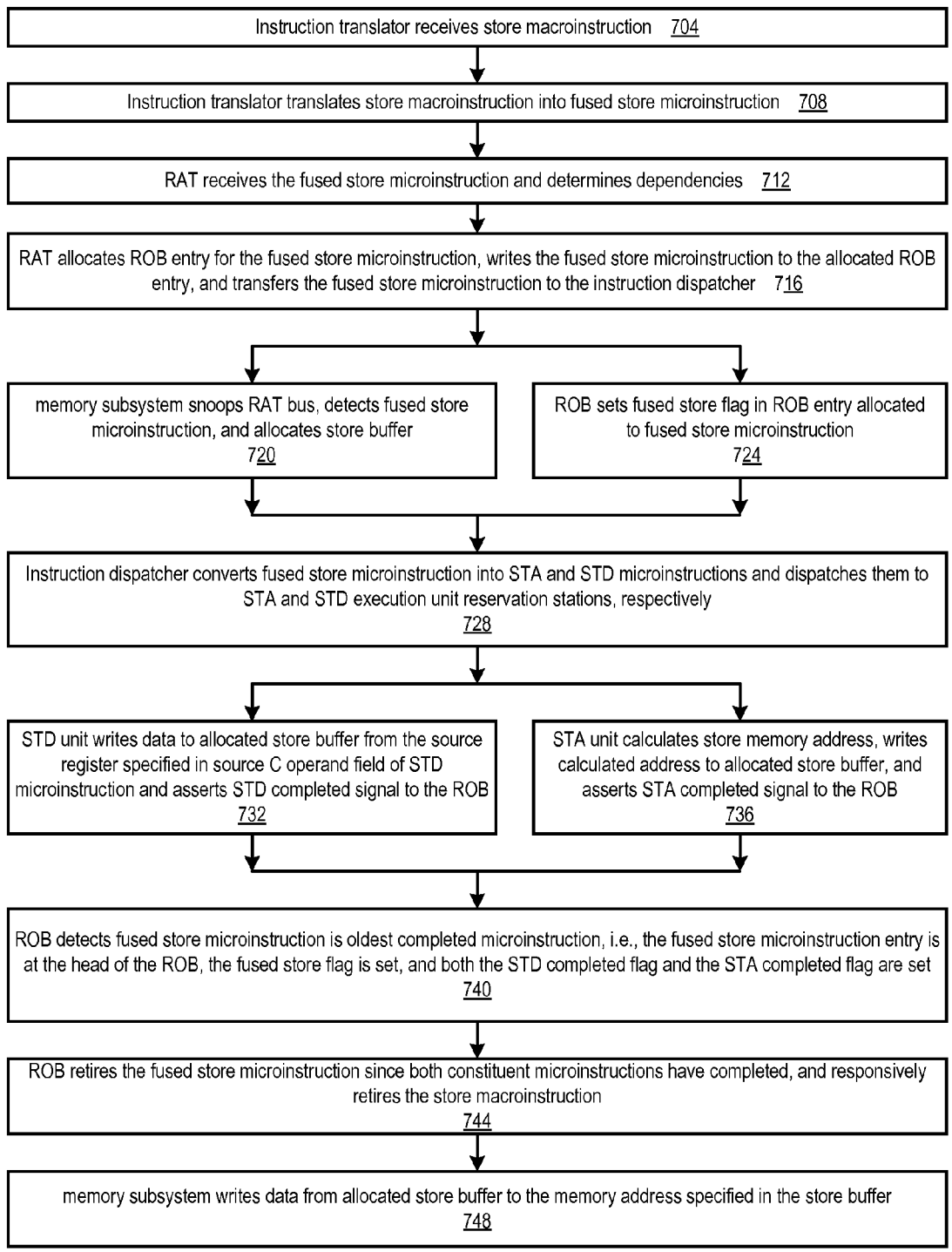
FIG. 7 is a flowchart illustrating operation of the microprocessor of FIG. 1 to execute a store macroinstruction of FIG. 3d by translating it into a fused store microinstruction of FIG. 3a according to the present invention.

Referring now to FIG. 7, a flowchart illustrating operation of the microprocessor 100 of FIG. 1 to execute a store macroinstruction 394 of FIG. 3d by translating it into a fused store microinstruction 304 of FIG. 3a according to the present invention is shown. Flow begins at block 704.

At block 704, the instruction translator 108 receives a store macroinstruction 394 of FIG. 3, as shown in FIGS. 5 and 6. In the example of FIG. 6, the store macroinstruction 394 is an x86 MOV [AX+BX], CX macroinstruction. That is, the opcode field 382 specifies an x86 MOV, the base field 384 specifies the AX register, the index field 386 specifies the BX register, the source field 388 specifies the CX register, and the displacement field 392 is unused. Flow proceeds to block 708.

At block 708, the instruction translator 108 translates the store macroinstruction 394 into a fused store microinstruction 304 of FIG. 3a, as shown in FIGS. 5 and 6. In the example of FIG. 6, the instruction translator 108 populates the source A field 312 with a value specifying the AX register, populates the source B field 316 with a value specifying the BX register, and populates the source C field 320 with a value specifying the CX register in response to the store macroinstruction 394. Flow proceeds to block 712.

At block 712, the register allocation table (RAT) 116 receives the fused store microinstruction 304 and calculates operand dependencies. In particular, the instruction dispatcher 118 determines which other microinstructions in the microprocessor 100 the fused store microinstruction 304 is dependent upon for its source operands. Flow proceeds to block 716.

At block 716, the RAT 116 allocates an entry 404 of FIG. 4 in the ROB 128 for the fused store microinstruction 304 (which is the entry at index 7 in the example of FIG. 5), writes the fused store microinstruction 304 into the microinstruction field 406 of the allocated entry 404, and transfers the fused store microinstruction 304 to the instruction dispatcher 118, as shown in FIGS. 5 and 6. When the RAT 116 writes a fused store microinstruction 304 into a ROB entry 404 microinstruction field 406, the RAT 116 also asserts the fused store indicator 504 of FIG. 5. Flow proceeds to blocks 720 and 724.

At block 720, the memory subsystem 132 snoops the RAT 116 bus, detects the fused store microinstruction 304, and allocates a store buffer 134. Flow proceeds to block 728.

At block 724, the ROB 128 sets fused store flag 408 in the ROB entry 404 corresponding to the fused store microinstruction 304, in response to the RAT 116 asserting the fused store indicator 504 of FIG. 5, to signify a fused store microinstruction 304 is stored in the microinstruction field 406. Flow proceeds to block 728.

At block 728, the instruction dispatcher 118 converts the fused store microinstruction 304 into a store address microinstruction 332 and a store data microinstruction 338, and dispatches the store address microinstruction 332 into the reservation station 266 of the STA Unit 224, and dispatches the store data microinstruction 338 into the reservation station 268 of the STD Unit 228, as shown in FIGS. 5 and 6. In particular, the instruction dispatcher 118 populates the source A field 340 of the store address microinstruction 332 with the value from the source A field 312 of the fused store microinstruction 304, which is AX in the example of FIG. 6; the instruction dispatcher 118 populates the source B field 344 of the store address microinstruction 332 with the value from the source B field 316 of the fused store microinstruction 304, which is BX in the example of FIG. 6; and the instruction dispatcher 118 populates the source C field 368 of the store data microinstruction 338 with the value from the source C field 320 of the fused store microinstruction 304, which is CX in the example of FIG. 6. In one embodiment, the instruction dispatcher 118 actually outputs on its bus a single fused store microinstruction 304 and the reservation stations 244-268 snoop the instruction dispatcher 118 bus. In response, the reservation stations 264 and 268 of the STA Unit 224 and STD Unit 228, respectively, each detect the presence of the fused store microinstruction 304 on the bus, treat the fused store microinstruction 304 as a store address microinstruction 332 and a store data microinstruction 338, respectively, and load the fused store microinstruction 304 into their respective reservation stations 264 and 268; additionally, the STA Unit 224 and STD Unit 228 are configured to treat the fused store microinstruction 304 as a store address microinstruction 332 and a store data microinstruction 338, respectively. Once the store address microinstruction 332 is the oldest microinstruction in the reservation station 266 that has all of its required source operands available, issue logic (not shown) issues the store address microinstruction 332 to the STA Unit 224 for execution. In particular, the issue logic ignores any dependencies for the source C field 348. Similarly, once the store data microinstruction 338 is the oldest microinstruction in the reservation station 268 that has all of its required source operands available, issue logic issues the store data microinstruction 338 to the STD Unit 228 for execution. In particular, the issue logic ignores any dependencies for the source A field 360 and the source B field 364. As discussed above, since the source A field 360 and source B field 364 are unused by the store data microinstruction 338 in this case, the microprocessor 100 includes special logic that enables the store data microinstruction 338 to read a source operand from a register of the GPRs 142 specified by the source C 368 field. The store address microinstruction 332 and the store data microinstruction 338 are not dependent upon each other and may execute out of order with respect to one another. Flow proceeds to blocks 732 and 736.

At block 732, the store data execution unit 228 writes data to the store buffer 134 allocated at block 720 from the source register specified in the source C field 368 and asserts the STD completed signal 520 to the ROB 128, as shown in FIG. 5. Prior to writing the data to the store buffer 134, the STD Unit 228 reads the data from the GPRs 142, in particular from the GPR 142 specified by the source C field 368. Flow proceeds to block 740.

At block 736, the store address execution unit 224 calculates the store memory address, writes the calculated address to the store buffer 134 allocated at block 720, and asserts the STA completed signal 516 to the ROB 128, as shown in FIG. 5. Prior to calculating the store memory address, the STA Unit 224 reads the address source operands from the GPRs 142, in particular from the GPRs 142 specified by the source A field 340 and the source B field 344. Flow proceeds to block 740.

At block 740, the ROB 128 detects that the fused store microinstruction 304 is the oldest microinstruction in the ROB 128 that has been completed. The ROB 128 knows that the fused store microinstruction 304 has completed because the fused store flag 408 is set, the STD completed flag 412 is set, and the STA completed flag 416 is set. Flow proceeds to block 744.

At block 744, the ROB 128 retires the fused store microinstruction 304 since both of the constituent STA 332 and STD 338 microinstructions have completed execution. Additionally, the ROB 128 retires the store macroinstruction 394 since the fused store microinstruction 304 is the only microinstruction associated with the store macroinstruction 394. Flow proceeds to block 748.

At block 748, the memory subsystem 132 writes the data that was written into the store buffer 134 at block 732 to the location in memory specified by the memory address that was written to the store buffer 134 at block 736. Flow ends at block 748.

As may be seen from FIGS. 5, 6, and 7, when the instruction dispatcher 118 receives a fused store microinstruction 304 from the RAT 116, rather than dispatching the fused store microinstruction 304 to an execution unit 124, the instruction dispatcher 118 dispatches a store address microinstruction 332 to the STA Unit 224 and dispatches a store data microinstruction 338 to the STD Unit 228, although neither the store address microinstruction 332 nor the store data microinstruction 338 occupy an entry in the ROB 128. The STD completion flag 412 indicates that the store data execution unit 228 has completed processing the store data microinstruction 338 associated with the fused store microinstruction 304 stored in the corresponding ROB entry 404. Similarly, the STA completion flag 416 indicates that the store address execution unit 224 has completed processing the store address microinstruction 332 associated with the fused store microinstruction 304 stored in the corresponding ROB entry 404. The ROB 128 waits to retire a fused store microinstruction 304 until both its constituent store address microinstruction 332 and store data microinstruction 338 have completed execution, as indicated by a true value in the STA completed flag 416 and the STD completed flag 412, respectively, as described herein. Advantages of translating the store macroinstruction 394 into a single fused store microinstruction 304 but dispatching both a store address microinstruction 332 and a store data microinstruction 338 for execution rather than dispatching the fused store microinstruction 304 for execution are: 1) the fused store microinstruction 304 occupies only a single ROB 128 entry 404, and 2) the store address microinstruction 332 requires only two read accesses of the GPRs 142 in a given clock cycle (as described above with respect to block 736 of FIG. 7) and the store data microinstruction 338 requires only one read access of the GPRs 142 in a given clock cycle (as described above with respect to block 732 of FIG. 7) which fosters the benefits discussed above regarding smaller, faster, lower power, and less complex GPRs 142; whereas, dispatching the fused store microinstruction 304 for execution would potentially require three read accesses of the GPRs 142 in a given clock cycle, thereby potentially increasing the number of read ports of the GPRs 142.

Referring now to FIG. 8a, a diagram illustrating a group of microinstructions in a reorder buffer of a conventional microprocessor is shown. The reorder buffer is shown with ten total entries, denoted 0 through 9. Each of the ten entries is populated with a microinstruction. The ten microinstructions have been translated from seven macroinstructions. In the example, the seven macroinstructions are an x86 MOV, ADD, CMP, MOV, ADD, SHR, and MOV macroinstruction. Each of the MOV macroinstructions have been translated into a separate STA microinstruction and STD microinstruction, such as those shown in FIGS. 3b and 3c, respectively. The other macroinstructions (ADD, CMP, SHR) have each been translated into a single microinstruction. In the example, for illustration purposes, assume the size of the reorder buffer is ten entries, and each of the ten microinstructions have been dispatched for execution, such that the reorder buffer is full.

Referring now to FIG. 8b, a diagram illustrating a group of microinstructions in ROB 128 of FIG. 1 according to the present invention is shown. FIG. 8b is similar to FIG. 8a, except that each of the MOV macroinstructions has been translated into a single fused store microinstruction 304 of FIG. 3, rather than into a separate STA microinstruction and STD microinstruction as in FIG. 8a. In particular, ROB entries 404 with reorder buffer tags 0, 3, and 6 contain fused store microinstructions 304. Consequently, the same seven macroinstructions of FIG. 8a have been translated into seven microinstructions that occupy only entries 0 through 6 in the ROB 128, leaving the top three entries (7 through 9) available for more microinstructions.

As may be observed from FIGS. 8a and 8b, the fact that the microprocessor 100 of the present invention translates a store macroinstruction 394 into a single fused store microinstruction 304 makes more room in the ROB 128 for microinstructions of additional macroinstructions than a conventional microprocessor that translates a store macroinstruction 394 into multiple microinstructions. This is an advantage because it potentially creates a larger pool of microinstructions that can be dispatched for execution to the execution units 124. As discussed above, a microinstruction cannot be dispatched for execution until it is "ready," i.e., until all its source operands are available. The source operands are typically the result of previous microinstructions; that is, microinstructions are often dependent upon the result of other microinstructions. Thus, the larger the pool of microinstructions at which the microprocessor 100 may look to find ready microinstructions, the more likely it is to find them, and consequently the more likely it is to keep the execution units 124 utilized. This is commonly referred to as the lookahead capability of a microprocessor, which exploits more fully the instruction level parallelism of the program being executed by the microprocessor 100. Greater lookahead capability typically increases the utilization of the execution units 124. Thus, the present microprocessor 100 advantageously increases the lookahead capability by translating a store macroinstruction 394 into the single fused store microinstruction rather than multiple microinstructions.

Referring now to FIG. 9a, a diagram illustrating an example of operation of a conventional microinstruction translator is shown. The conventional translator, like one embodiment of the instruction translator 108 of FIG. 1, is capable of generating up to three microinstructions in the same clock cycle. Additionally, the conventional translator, like one embodiment of the instruction translator 108 of FIG. 1, waits to translate a macroinstruction until it can generate all the microinstructions associated with the macroinstruction in the same clock cycle.

The conventional translator receives the following stream of three macroinstructions:
MOV [mem], CX
MOV [mem] AX
ADD SI, DX
The first macroinstruction is the MOV [mem], CX macroinstruction, which moves the contents of the CX register to a location in memory. The conventional translator sees the MOV [mem], CX macroinstruction and responsively generates a store address microinstruction 332 of FIG. 3b and a store data microinstruction 338 of FIG. 3c in a first clock cycle. In the example, the store address microinstruction 332 occupies the ROB 128 entry 404 at index 1 and the store data microinstruction 338 occupies the ROB 128 entry 404 at index 2, as shown. The conventional translator also sees the MOV [mem], AX macroinstruction in the same clock cycle that it sees the MOV [mem], CX macroinstruction. However, even though the conventional translator can generate three microinstructions in a clock cycle, it cannot translate the MOV [mem], AX macroinstruction in the same clock cycle as the MOV [mem], CX macroinstruction because this would require the conventional translator to generate four microinstructions in the same clock cycle because the conventional translator translates a store macroinstruction 394 into two microinstructions. Therefore, the conventional translator waits until the next clock cycle to translate the MOV [mem], CX macroinstruction into a store address microinstruction 332 and a store data microinstruction 338, which occupy the ROB 128 entries 404 at indexes 3 and 4, respectively, as shown. Additionally, the conventional translator sees the ADD SI, DX macroinstruction and responsively generates a single ADD microinstruction, which occupies the ROB 128 entry 404 at index 5, in the same (second) clock cycle as the store address and store data microinstructions generated from the MOV [mem], AX macroinstruction. As may be observed, the conventional translator requires two clock cycles to translate the three macroinstruction sequence above and generates five microinstructions that occupy five entries 404 in the ROB 128.

Referring now to FIG. 9b, a diagram illustrating an example of operation of the microinstruction translator 108 of FIG. 1 according to the present invention is shown. Translator 108 receives the same stream of three macroinstructions 104 as shown in FIG. 9a: a MOV [mem], CX macroinstruction, a MOV [mem] AX macroinstruction, and an ADD SI, DX macroinstruction. The translator 108 sees all three of the macroinstructions in the same clock cycle and advantageously translates all three of them in a single same clock cycle, as shown. In particular, the instruction translator 108 advantageously generates a first fused store microinstruction from the MOV [mem], CX macroinstruction; a second fused store microinstruction from the MOV [mem], AX macroinstruction; and an ADD microinstruction from the ADD SI, DX macroinstruction in the same clock cycle, and the three microinstructions occupy the ROB 128 entries 404 at indexes 1, 2, and 3, respectively, as shown.

A comparison of the examples shown in FIGS. 9a and 9b illustrates two advantages of the embodiments of the present invention. First, by translating a store macroinstruction 394 into a single fused store microinstruction 304, the microprocessor 100 potentially increases the number of microinstructions that can be generated by the translator 108 in a single clock cycle relative to a conventional microprocessor. In particular, the single fused store microinstruction 304 enables the translator 108 to enjoy more clock cycles in which it generates three microinstructions 106, rather than two or one microinstructions; alternatively, the single fused store microinstruction enables the translator 108 to enjoy more clock cycles in which it generates two microinstructions 106, rather than one microinstruction. This potentially increases the lookahead capability of the microprocessor 100 and the utilization of the execution units 124, ultimately increasing the number of macroinstructions executed per second. Second, the fused store microinstruction 304 occupies only one ROB 128 entry 404, whose benefits are described above.

Although embodiments have been described in which the microprocessor 100 translates a store macroinstruction 394 into a single fused store microinstruction 304, other embodiments are contemplated in which the microprocessor 100 translates other macroinstructions that perform both a store operation to memory and additional operations into a sequence of microinstructions that includes a fused store microinstruction 304 or a microinstruction similar to a fused store microinstruction 304, as follows.

One of the new microinstructions similar to a fused store microinstruction 304 is a fused store push microinstruction, which is similar to the fused store microinstruction 304 of FIG. 3a in that it has the same fields as shown in FIG. 3a; however, the fused store push microinstruction also performs a pre-update of the register specified in the destination field 324 and has a different value of the opcode field 308. In particular, the fused store push microinstruction pre-decrements or pre-increments the register specified in the destination field 324, depending upon the value of the DF flag in the EFLAGS register. The other new microinstruction similar to a fused store microinstruction 304 is a fused store update microinstruction, which is similar to the fused store microinstruction 304 of FIG. 3a in that it has the same fields as shown in FIG. 3a; however, the fused store update microinstruction also performs a post-update of the register specified in the destination field 324 and has a different value of the opcode field 308. In particular, the fused store update microinstruction post-decrements or post-increments the register specified in the destination field 324, depending upon the value of the DF flag in the EFLAGS register.

Referring now to FIG. 10, examples of x86 macroinstructions that the microprocessor 100 translates into microinstruction sequences that include the fused store microinstruction 304, the fused store push microinstruction, or the fused store update microinstruction according to the present invention are shown. In the listing of FIG. 10, the MvFrmEfl microinstruction moves the EFLAGS register value into a temporary register; the AND microinstruction masks off certain bits in the temporary register; the XLEA microinstruction performs an x86-style load effective address operation with the specified register to increment the address; the LOAD microinstruction loads into a temporary register an operand from memory at the location specified by the registers pointed to by the first two source fields; the Xbcc microinstruction performs an x86-style branch relative to the next sequential instruction pointer; and the MOVZX microinstruction performs a move with zero extend operation. In one embodiment, the microprocessor 100 also translates an x86 ENTER macroinstruction into a microinstruction sequence that includes the fused store microinstruction 304.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the present invention may include methods of providing a microprocessor described herein by providing software describing the design of the microprocessor and subsequently transmitting the software as a computer data signal over a communication network including the Internet and intranets. It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the herein-described exemplary embodiments, but should be defined only in accordance with the following claims and their equivalents. The present invention is implemented within a microprocessor device which may be used in a general purpose computer.

Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, having a macroarchitecture with a macroinstruction set and a microarchitecture with a microinstruction set, the microprocessor comprising:
   an x86 EFLAGS register;
   an instruction translator, configured to translate an x86 push flags (PUSHF) macroinstruction into first, second, and third microinstructions, wherein the PUSHF macroinstruction is an instruction in the macroinstruction set that instructs the microprocessor to push the value of the x86 EFLAGS register of the microprocessor to a memory location specified by a stack pointer register of the microprocessor, wherein the first microinstruction moves the x86 EFLAGS register value into a temporary register of the microprocessor, wherein the second microinstruction masks off bits in the temporary register, and the third microinstruction is a fused store push microinstruction that pre-updates a register specified by a destination field and stores the masked-off value in the temporary register to the memory location, wherein the first, second, and third microinstructions are instructions in the microinstruction set;
   a hardware reorder buffer (ROB), having a plurality of entries, configured to receive from the instruction translator the fused store push microinstruction into exactly one of the plurality of entries; and
   an instruction dispatcher, configured to dispatch for execution a store address microinstruction and a store data microinstruction to different respective execution units of the microprocessor, in response to receiving the fused store push microinstruction, wherein neither the store address microinstruction nor the store data microinstruction occupy any of the plurality of ROB entries;
   wherein the ROB is further configured to retire the fused store push microinstruction after being notified that both the store address microinstruction and the store data microinstruction have been executed.

2. The microprocessor of claim 1, further comprising:
   a store address unit, configured to receive the store address microinstruction from the instruction dispatcher and to notify the ROB after having executed the store address microinstruction; and
   a store data unit, configured to receive the store data microinstruction from the instruction dispatcher and to notify the ROB after having executed the store data microinstruction.

3. The microprocessor of claim 2, wherein the store data unit is configured to store the data from the x86 EFLAGS register to a store buffer of the microprocessor, in order to execute the store data microinstruction.

4. The microprocessor of claim 3, wherein the store address unit is configured to generate an address of the memory location specified by the PUSHF macroinstruction and to write the memory address to the store buffer, in order to execute the store address microinstruction.

5. The microprocessor of claim 1, wherein the ROB is further configured to retire the PUSHF macroinstruction after retiring the fused store push microinstruction.

6. The microprocessor of claim 1, further comprising:
a general purpose register set, wherein microinstructions of the microinstruction set are enabled to read a source operand from each of two registers of the general purpose register set specified by first and second respective source
an instruction dispatcher, configured to dispatch for execution a store address microinstruction and a store data microinstruction to different respective execution units of the microprocessor, in response to receiving the fused store microinstruction, wherein neither the store address microinstruction nor the store data microinstruction occupy any of the plurality of ROB entries, and wherein the store address microinstruction directs an operation on the plurality of address-indicating register values to determine the second memory location;
wherein the ROB is further configured to retire the fused store microinstruction after being notified that both the store address microinstruction and the store data microinstruction have been executed.

7. The microprocessor of claim 1, wherein each of the plurality of ROB entries includes an indicator for indicating that both the store address microinstruction and the store data microinstruction have been executed.

8. A microprocessor, having a macroarchitecture with a macroinstruction set and a microarchitecture with a microinstruction set, the microprocessor comprising:
an instruction translator, configured to translate an x86 pop a value from a stack to memory (POP) macroinstruction into at least first and second microinstructions, wherein the POP macroinstruction is an instruction in the macroinstruction set that instructs the microprocessor to pop a value of a first memory location specified by a stack pointer register of the microprocessor to a second memory location, wherein the first microinstruction loads into a temporary register of the microprocessor the value from the first memory location, wherein the second microinstruction is a fused store microinstruction that stores the value in the temporary register to the second memory location, wherein the first and second microinstructions are instructions in the microinstruction set, and wherein the second memory location is indicated by a combination of a plurality of address-indicating register values;
a hardware reorder buffer (ROB), having a plurality of entries, configured to receive from the instruction translator the fused store microinstruction into exactly one of the plurality of entries; and
wherein the first and second microinstructions are instructions in the microinstruction set;
a hardware reorder buffer (ROB), having a plurality of entries, configured to receive from the instruction translator the fused store update microinstruction into exactly one of the plurality of entries; and
an instruction dispatcher, configured to dispatch for execution a store address microinstruction and a store data microinstruction to different respective execution units of the microprocessor, in response to receiving the fused store update microinstruction, wherein neither the store address microinstruction nor the store data microinstruction occupy any of the plurality of ROB entries;
wherein the ROB is further configured to retire the fused store update microinstruction after being notified that both the store address microinstruction and the store data microinstruction have been executed.

9. The microprocessor of claim 8, wherein the instruction translator is further configured to translate the POP macroinstruction into a third microinstruction that performs a load effective address operation with the stack pointer register to increment its address.

10. A microprocessor, having a macroarchitecture with a macroinstruction set and a microarchitecture with a microinstruction set, the microprocessor comprising:
an instruction translator, configured to translate an x86 move data from string to string (MOVSB) macroinstruction into at least first and second microinstructions, wherein the MOVSB macroinstruction is an instruction in the macroinstruction set that instructs the microprocessor to move an operand from a first memory location to a second memory location, wherein the first microinstruction loads into a temporary register of the microprocessor the operand from the first memory location, wherein the second microinstruction is a fused store update microinstruction that stores the operand in the temporary register to the second memory location and performs a post-update of a register specified by a destination field, operand fields of the microinstructions, wherein the microinstructions of the microinstruction set are not enabled to read a source operand from registers of the general purpose register set specified by a third source operand field of the microinstructions.

11. The microprocessor of claim 10, wherein the first memory location is specified by a first index register of the microprocessor, wherein the second memory location is specified by a second index register of the microprocessor, wherein the fused store update microinstruction is further configured to increment the second index register.

12. The microprocessor of claim 11, wherein the instruction translator is further configured to translate the MOVSB macroinstruction into a third microinstruction that performs a load effective address operation with the first index register to increment its address.

* * * * *